Jan. 26, 1965 J. A. WEYRAUCH ETAL 3,166,938
FLUID SAMPLING DEVICE
Filed May 21, 1962 2 Sheets-Sheet 1
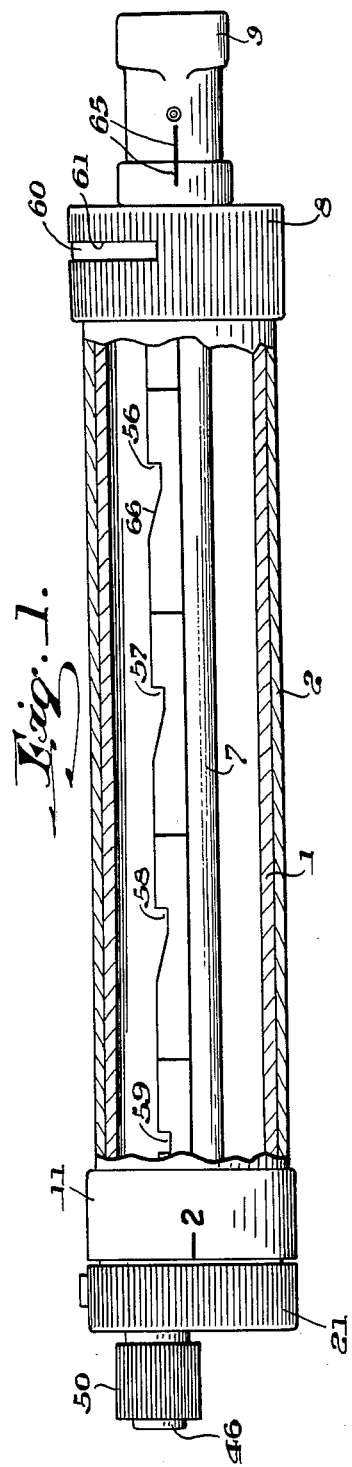
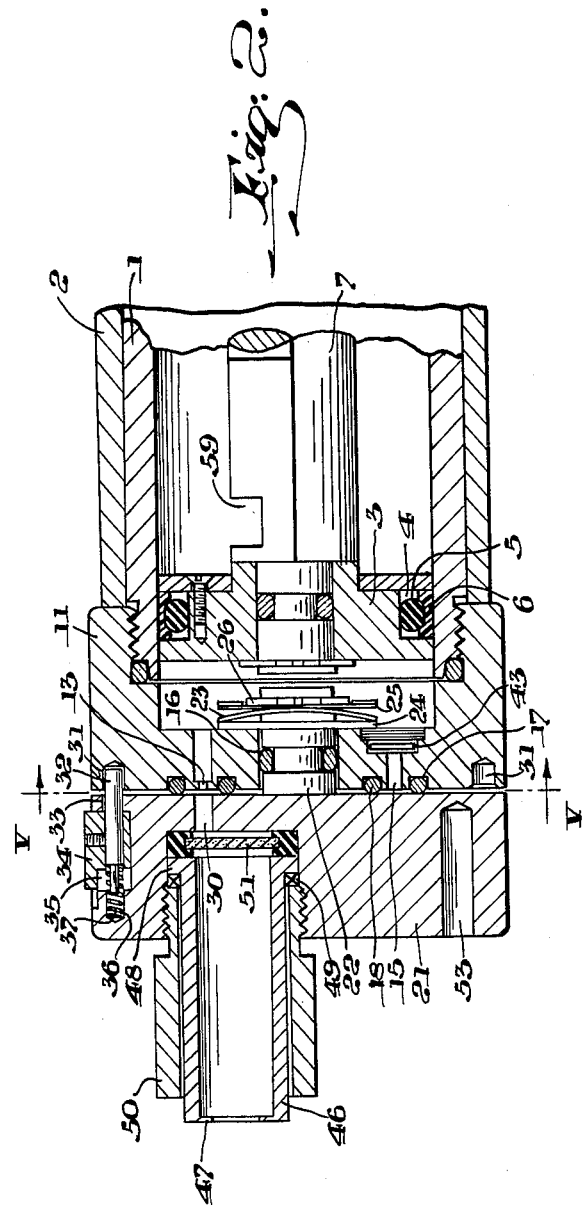
INVENTORS.
JOHN A. WEYRAUCH,
ALEXANDER C. McINNES,
ROBERT S. KUSH.
BY
Brown, Critchlow, Flick & Peckham,
their
ATTORNEYS.

INVENTORS.
JOHN A. WEYRAUCH,
ALEXANDER C. McINNES,
ROBERT S. KUSH.
BY Brown, Critchlow, Flick & Peckham.
their ATTORNEYS.

3,166,938
FLUID SAMPLING DEVICE
John A. Weyrauch, Pittsburgh, Alexander Crawford
McInnes, Export, and Robert Stanley Kush, Jeannette,
Pa., assignors to Mine Safety Appliances Company,
Pittsburgh, Pa., a corporation of Pennsylvania
Filed May 21, 1962, Ser. No. 196,292
7 Claims. (Cl. 73—421.5)

This invention relates to devices for sampling or analyzing fluids, and more particularly to such devices that circulate fluids through analyzing elements.

One way of analyzing a fluid, such as a gas, is to force or draw the gas through an element containing a chemical that will react with certain ingredients in the gas to indicate whether or not they are present. This indication may be affected by the rate of flow of the gas through the chemical and by the volume of gas that passes through it.

It is among the objects of this invention to provide a device for sampling a fluid, which is of simple and durable construction, which is easy to operate, which makes it possible to control the volume of fluid being sampled, and which is adjustable to provide different rates of flow for the fluid.

In accordance with this invention a piston is slidably mounted in a barrel that has a head closing its front end. Extending from the piston back through the barrel and out of its rear end is a piston rod, on the outer end of which a handle is mounted. The head is provided with a plurality of circumferentially spaced orifices having different sizes. The orifices are covered by a control plate in front of the head, which is rotatable relative to it. The plate is provided with a passage through it adapted to be selectively aligned with any one of the orifices by simply turning the plate to the desired position. When the handle is pulled back, a fluid will be drawn into the barrel through the passage and the orifice that is aligned with it. An analyzing element is placed in a position that will require the fluid to flow through it as it enters the sampling device. The head of the device may also have an exhaust port containing a check valve. Means may be provided for locking the piston rod against forward movement from any of several different predetermined positions, whereby to control the volume of fluid being sampled.

The preferred embodiment of the invention is illustrated in the accompanying drawings, in which FIG. 1 is a side view of our sampling device, with the barrel broken away to show the piston rod;

FIG. 2 is a fragmentary enlarged longitudinal section through the front end of the device;

Figure 3:
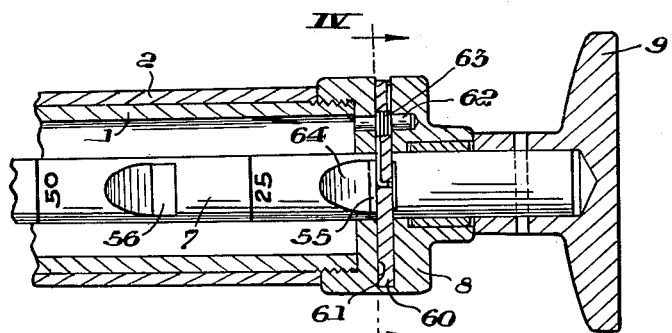
FIG. 3 is a fragmentary longitudinal section through the rear end of the device.

Referring to FIGS. 1, 2 and 3 of the drawings, the sampling device includes a barrel formed from a cylinder 1 threaded at both ends and enclosed in a sleeve 2. The barrel contains a piston 3 for drawing the fluid to be sampled into the barrel. The piston is normally located near the front end of the barrel and is encircled by an annular groove 4, in which there is an O-ring 5 of rubberlike material encircled by a Teflon band 6 that engages the wall of the barrel. The Teflon band assures long life and minimum friction, while the O-ring prevents the band from taking a permanent set that might affect the seal. Rigidly mounted in the piston is the front end of a piston rod 7 that extends back through the barrel and out through a cap 8 screwed onto the rear end of the barrel cylinder. The projecting outer end of the rod supports a handle 9, by which the rod can be pulled and pushed and turned.

Figure 5:
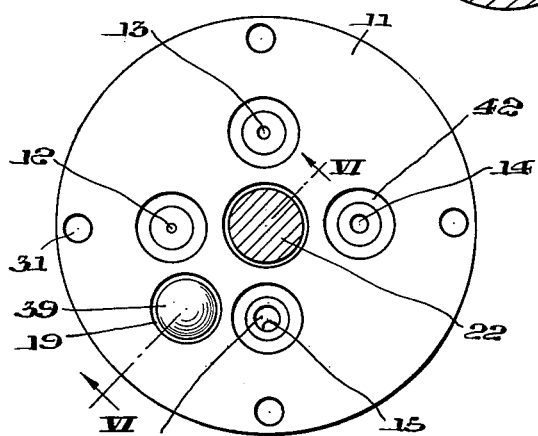
FIG. 5 is a cross section taken on the line V—V of FIG. 2.
Figure 6:
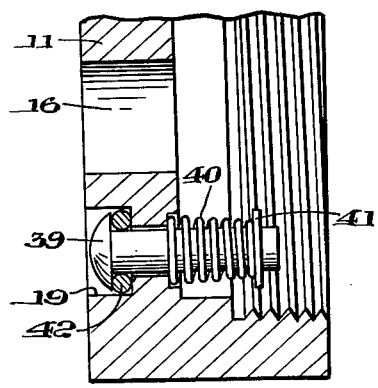
FIG. 6 is an enlarged fragmentary longitudinal section taken on the line VI—VI of FIG. 5.

The front end of the barrel is closed by a circular head 11 screwed onto cylinder 1, and the front wall of the head is provided with a plurality of circumferentially spaced orifices 12, 13, 14 and 15 of different predetermined sizes (FIG. 5). These orifices are arranged in a circle concentric with the head, the center of which is provided with an opening 16 through it. The front surface of the head is provided around each orifice with a circular groove 17 in which a small sealing ring 18 is mounted. The groove is shallow enough to cause the ring to project slightly from the face of the head. Preferably, the head also is provided with an exhaust port 19, as shown in FIGS. 5 and 6.

Disposed in front of head 11 is a thick circular control plate 21 that may have the same diameter as the head. A stem 22 that is joined to the inner face of the plate extends through the central opening in the head, in which it is rotatably mounted. The plate is held tightly against the sealing rings 18 around the orifices by means of a spring washer 23 mounted on the projecting rear end of the stem and compressed between a plain washer 24 and a locking washer 25. The latter is held in place by a spring retaining clip 26 mounted in a peripheral groove in the stem.

The control plate 21 has a passage 30 through it, as shown in FIG. 2, the inner end portion on which is the same distance from the axis of the stem as are the orifices. It will therefore be seen that by rotating the plate, the periphery of which may be knurled, the inner end of the passage can be aligned with any one of the orifices to vary the rate of flow into the barrel. To hold the plate in any selected position, the front of the head is provided with holes 31, one for each orifice. A locking pin 32 can project into any selected hole from the plate in front of it. The pin extends from the head forward through a hole 33 in the plate and through a button 34 that is rigidly mounted on it and slidably mounted in a radial slot 35 in the plate. The button projects from the plate slightly so that it can be pushed forward to move the reduced front end of the pin into a bore 36 in the front part of the plate and thereby withdraw the pin from the hole in the head. The pin is urged toward the head by a coil spring 37 disposed in the bore and also encircling the reduced front end of the pin.

Figure 7:
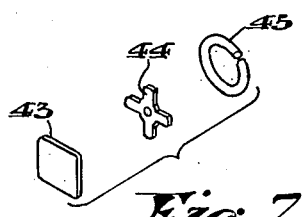
FIG. 7 is an exploded view of the inlet valve.

The exhaust port 19 in the head is provided with a check valve to prevent air being drawn in through that port. The valve may take various forms, a simple one being formed from a headed stud 39 extending through the port, with its projecting inner end encircled by a coil spring 40 compressed between head 11 and a retaining member 41 on the rear end of the stud, so that the head of the stud presses a sealing ring 42 against a radial wall inside the port. When the piston is pushed forward in the barrel to force the fluid out, it will escape through the exhaust valve as long as orifice 12, 13 or 14 is aligned with the passage plate, because they will offer so much resistance to passage of fluid therethrough that practically all of it will leave the barrel through the exhaust port. However, when the largest orifice 15, which may be as large as the exhaust port, is aligned with the plate passage 30, there would be a tendency for the fluid to be forced out of the barrel through that orifice as well as through the exhaust port. To prevent that from happening, it is desirable to provide the inner end of the largest orifice with an inlet valve, which may be formed from a flat valve member 43 loosely held in the enlarged rear end portion of the orifice by a spider 44 that is held in place by a spring retaining ring 45 as shown in FIG. 7. It will not interfere with flow of fluid through the orifice into the barrel.

The front end portion of the passage 30 through the control plate is greatly enlarged and contains the rear end portion of a forwardly projecting tubular holder 46 for a fluid analyzing element of well-known construction. This holder has a radial flange 47 at its front end for holding the element in place, and its rear end is encircled by a flange 48, against which a washer 49 is pressed by a knurled retaining nut 50 encircling the holder and screwed into the front end of the passage. It is preferred to clamp a filter disc 51, which may be made of porous metal, in the rear end of the large part of the passage so as to protect the orifices from foreign particles that might otherwise block them and alter the flow rates through them.

The control plate may also be provided with a rearwardly exending bore 53 for receiving the reduced sealed ends of the tubular glass analyzing element in order to break off those ends before the element is placed in holder 46.

Figure 4:
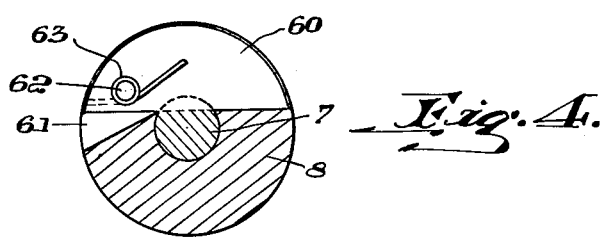
FIG. 4 is a cross section taken on the line IV—IV of FIG. 3.

Another feature of this invention is that the piston can be pulled back in the barrel various measured distances to control the volume of fluid that is drawn into the barrel. For example, if the capacity of the barrel is 100 cubic centimeters when the piston is retracted full distance, provision may be made for stopping the rearward movement of the piston when it is a quarter of the way back, half way or three-quarters of the way back to provide capacities of 25 cc., 50 cc. and 75 cc., respectively. As shown in FIGS. 1, 3 and 4, this is done by providing the side of the piston rod with a line of notches 55, 56, 57, 58 and 59 for receiving a pivoted latch or stop. The stop is a flat plate 60 that is loosely mounted in a slot 61 in the rear end cap extending from its periphery radially inward nearly half way across the cap. One end of the stop has a hole through it, in which is mounted a pivot pin 62 that extends into aligned holes in the cap at opposite sides of the stop. Encircling the pin inside the stop is a torsion spring 63, the ends of which are anchored in grooves in opposite sides of the stop. This spring presses the stop against the side of the piston rod.

While the piston is all the way forward, the stop will rest in the rear notch 55, as shown in FIG. 3, so that the stop will not project from the cap. When the handle is pulled back, the inclined front wall 64 of the notch will push the stop outward until the periphery of the rod is reached. The rod will continue to slide back across the stop until the latter snaps into the second notch 56. If the handle then is released, engagement of the rear wall of the notch with the stop will prevent the reduced fluid pressure in the front end of the barrel from drawing the piston forward again. In case the operator then wishes to move the handle forward, he will rotate it about 90° to cause the periphery of the rod at either end of the notch 56 to swing the stop out of the notch so that the rod can slide forward. After the handle has been pushed its full distance forward, it is turned back to its original position, which can be determined by index lines 65 (FIG. 1) marked on the sides of the handle and rod and cap 8. On the other hand, if the operator wishes to pull the piston at least half way back in the barrel, he need not turn the handle but merely continue to pull on it after the stop snaps into the second notch. The inclined front wall 66 of that notch will prevent it from interfering with rearward movement of the piston rod. The same thing is true of the half-way and three-quarter way notches 57 and 58. Therefore, although the radial rear wall of a notch engaging the stop will prevent the rod from moving forward, the stop cannot prevent the rod from being pulled backward across the stop.

According to the provision of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A fluid sampling device comprising a barrel, a head closing the front end of the barrel, a piston in the barrel normally near said head, a piston rod extending from the piston back through the barrel and out of its rear end, a handle on the outer end of the rod, said head being provided with a plurality of circumferentially spaced orifices therethrough of different sizes, a control plate in front of said head covering said orifices, and means rotatably connecting the plate to the head, the plate being provided with a passage therethrough adapted to be selectively aligned with any of said orifices by turning the plate, whereby when the handle is pulled back a fluid will be drawn into the barrel through said passage and the orifice aligned with it.

2. A fluid sampling device according to claim 1, in which said head is provided with an inwardly extending hole beside each orifice, a spring-pressed pin projects from the inner side of said plate into one of said holes to lock the plate in position, and a radial projection from the pin is slidable across the plate for withdrawing the pin from the head so that the plate can be turned.

3. A fluid sampling device according to claim 1, in which the outer end portion of said plate passage is considerably larger than its inner end, and a filter is mounted in said larger part of the passage to protect its smaller inner end.

4. A fluid sampling device according to claim 1, in which the outer end portion of said plate passage is considerably larger than its inner end, and a sampling tube holder is mounted in said larger part of the passage and projects from its outer end.

5. A fluid sampling device according to claim 1, in which said head also has an exhaust port provided with a check valve, and the largest of said head orifices is provided with an inlet valve.

6. A fluid sampling device comprising a barrel, a head closing the front end of the barrel, a piston in the barrel normally near said head, a piston rod extending from the piston back through the barrel and out of its rear end, a handle on the outer end of the rod, said head being provided with a plurality of circumferentially spaced orifices therethrough of different sizes around a central opening, a sealing ring secured in the front of said head around each orifice and projecting from the head, a control plate in front of the head engaging said rings, a stem extending from the center of the plate through said head opening, means on the rear end of the stem pulling the plate toward the head, the plate being provided with a passage therethrough adapted to be selectively aligned with any of said orifices by turning the plate, whereby when the handle is pulled back a fluid will be drawn into the barrel through said passage and the orifice aligned with it, said head also having an exhaust port, and a check valve in said port.

7. A fluid sampling device comprising a barrel, a head closing the front end of the barrel, a piston in the barrel normally near said head, a piston rod extending from the piston back through the barrel and out of its rear end, a handle on the outer end of the rod, said head being provided with a plurality of circumferentially spaced orifices therethrough of different sizes, a control plate in front of said head covering said orifices, means rotatably connecting the plate to the head, the plate being provided with a passage therethrough adapted to be selectively aligned with any of said orifices by turning the plate, whereby when the handle is pulled back a fluid will be drawn into the barrel through said passage and the orifice aligned with it, the side of the piston rod being provided with a notch, a stop pivotally mounted in the barrel, and a spring for swinging the stop into said notch when the rod is pulled back a predetermined distance, the stop being pushed out of the notch by the portion of the rod at one side of the notch when the handle is turned to turn the notch away from the stop.

References Cited in the file of this patent
UNITED STATES PATENTS

| | | |
|---|---|---|
| 1,093,907 | Birnbaum | Apr. 21, 1914 |
| 1,950,854 | Lerch | Mar. 13, 1934 |
| 2,234,499 | McAllister | Mar. 11, 1941 |
| 2,805,132 | Kuhns | Sept. 3, 1957 |